United States Patent
Zhong et al.

(10) Patent No.: US 11,820,787 B2
(45) Date of Patent: Nov. 21, 2023

(54) BENFOTIAMINE DERIVATIVES IN THE TREATMENT OF ALZHEIMER'S DISEASE

(71) Applicant: SHANGHAI RAISING PHARMACEUTICAL CO., LTD., Shanghai (CN)

(72) Inventors: Chunjiu Zhong, Shanghai (CN); Huan Zhang, Shanghai (CN)

(73) Assignee: SHANGHAI RAISING PHARMACEUTICAL CO., LTD., Shanghai (CN)

( * ) Notice: Subject to any disclaimer, the term of this patent is extended or adjusted under 35 U.S.C. 154(b) by 101 days.

(21) Appl. No.: 17/173,059

(22) Filed: Feb. 10, 2021

(65) Prior Publication Data

US 2021/0163515 A1 Jun. 3, 2021

Related U.S. Application Data

(62) Division of application No. 16/549,700, filed on Aug. 23, 2019, now Pat. No. 10,947,258.

(51) Int. Cl.
*C07F 9/6512* (2006.01)

(52) U.S. Cl.
CPC .................................. *C07F 9/6512* (2013.01)

(58) Field of Classification Search
CPC .................................................... C07F 9/6512
See application file for complete search history.

(56) References Cited

U.S. PATENT DOCUMENTS 10,947,258 B1 * 3/2021 Zhong .................. C07F 9/6512

FOREIGN PATENT DOCUMENTS

| AU | 19360/70 | | 8/1970 |
|---|---|---|---|
| CN | 101134048 A | * | 3/2008 |
| CN | 101134048 A | | 3/2008 |
| CN | 101317849 A | | 12/2008 |
| CN | 102911208 A | | 2/2013 |
| CN | 103772432 A | | 5/2014 |
| EP | 2918593 A1 | | 9/2015 |
| FR | 1467761 A | | 1/1967 |
| GB | 1264580 A | | 2/1972 |
| WO | WO 2016/079576 A1 | | 5/2016 |

OTHER PUBLICATIONS

CA Network STN Database; Chemical Abstract Service; RN: 32532-50-6, RN: 47734-04-3, RN: 750-77-6, RN: 750-82-3, RN: 751-47-3, and RN: 856770-60-0; Feb. 23, 1972; 13 pages.
Yan Zhao-feng et al.; "Anti-Alzheimer's activity and pharmacokinetics of benfotiamine"; World Clinical Medicine; vol. 32; Aug. 2011; p. 495-498 contains English Abstract.
Pan et al.; Neurosci. Bull.; Dec. 2016; 32(6):591-596.
Sankyo Co. Chemical Abstract, vol. 68 No. 59602 (Abstract for FR 1467761, Jan. 27, 1967). Year 1968.
Ito Chemical Absract vol. 58 No. 39768 (Abstrat for Yakugaku Zasshi, 1962, 82, 883-8). Year 1963.
Sunagawa et al. Chemical Abstract, vol. 62 No. 58989 (Abstract for JP 39019171, 1964). Year 1965.

* cited by examiner

*Primary Examiner* — John S Kenyon
(74) *Attorney, Agent, or Firm* — BakerHostetler

(57) ABSTRACT

The present disclosure relates to benfotiamine derivatives, a method for preparing the same and use of the benfotiamine derivatives in the manufacture of a medicament for the treatment of Alzheimer's disease.

2 Claims, No Drawings

BENFOTIAMINE DERIVATIVES IN THE TREATMENT OF ALZHEIMER'S DISEASE

CROSS REFERENCE TO RELATED APPLICATIONS

This application is a divisional application of U.S. application Ser. No. 16/549,700, filed Aug. 23, 2019, and the disclosures of which are hereby incorporated by reference.

TECHNICAL FIELD

The present disclosure relates to the fields of medicine and chemistry, and more particularly, to benfotiamine derivatives, a method for preparing the same and a pharmaceutical composition comprising the same.

BACKGROUND

Alzheimer's disease (AD, commonly known as senile dementia) is a progressive neurodegenerative disorder characterized by cognitive and behavioral disorders. It is one of the most common form of elderly dementia primarily with recognition disorder and rapid decay in memory function. The main pathological features of Alzheimer's disease are senile plaques caused by the deposition of β-amyloid (Aβ) in the brain, neurofibrillary tangles caused by the hyperphosphorylation of tau protein, the glucose dysmetabolism in the brain and the loss of neuronal/synaptic junction. Due to long courses of illness and the poor self-care ability of patients, AD brings serious mental and economic burdens to families and the society. However, currently, few medicines in the worldwide can prevent or slow down the progression of this disease. Medicines on the market now for the treatment of AD are symptomatic, which can only control or improve cognitive and functional symptoms for a period of time, but cannot prevent or delay the deterioration of the disease.

Benfotiamine, chemical name: S-[2-[[(4-amino-2-methyl-5-pyrimidinyl) methyl]formylamino]-1-[2-(phosphonooxy)ethyl]-1-propenyl]ester, the molecular formula: $C_{19}H_{23}N_4O_6PS$, which can greatly improve low-bioavailability of water-soluble vitamin $B_1$ and can elevate the thiamine level in the blood and tissues, thereby increasing the curative effect. The present researches on benfotiamine mainly focus on the synthesis method, the crystal form and the application in medicine. Although recent studies have shown that benfotiamine can be used to the preparation of the prevention and treatment of Alzheimer's disease, for example, the patent application CN2007100411571.X discloses a pharmaceutical composition containing benfotiamine for the treatment of Alzheimer's disease, no studies have been found on the use of benfotiamine derivatives and medicine uses thereof, particularly the derivatives used in Alzheimer's disease.

SUMMARY

Embodiments of the present disclosure provide benfotiamine derivatives, a method for preparation of the same and a pharmaceutical composition comprising the same.

In an embodiment, benfotiamine derivatives are provided, wherein the benfotiamine derivatives are as shown in formula (1):

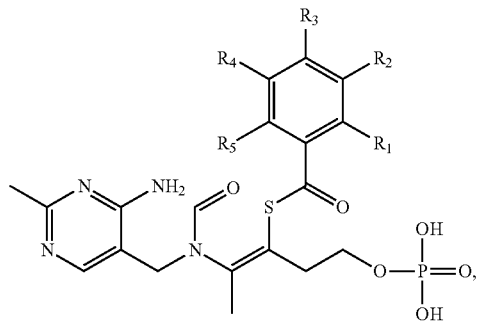

wherein, $R_1$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_2$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_3$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_4$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_5$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group; and wherein at least one of $R_1$, $R_2$, $R_3$, $R_4$ and $R_5$ is not hydrogen atom.

Optionally, only one of $R_1$, $R_2$, $R_3$, $R_4$ and $R_5$ is not hydrogen atom, and any one of the others is hydrogen atom.

Optionally, each one of $R_2$, $R_3$, $R_4$ and $R_5$ is hydrogen atom, and $R_1$ is halogen atom or ethoxy group.

Optionally, each one of $R_2$, $R_3$, $R_4$ and $R_5$ is hydrogen atom, and $R_1$ is fluorine atom or bromine atom.

Optionally, each one of $R_1$, $R_3$, $R_4$ and $R_5$ is hydrogen atom, and $R_2$ is bromine atom, chlorine atom, fluorine atom or nitro group.

Optionally, each one of $R_1$, $R_2$, $R_4$ and $R_5$ is hydrogen atom, and $R_3$ is chlorine atom, methoxy group or nitro group.

In an embodiment, a method for preparing the above benfotiamine derivatives is provided, wherein a compound of monophosphothiamine the formula (1a) shows reacts with a compound of benzoyl chloride the formula (1b) shows so as to prepare and obtain the benfotiamine derivatives of the formula (1).

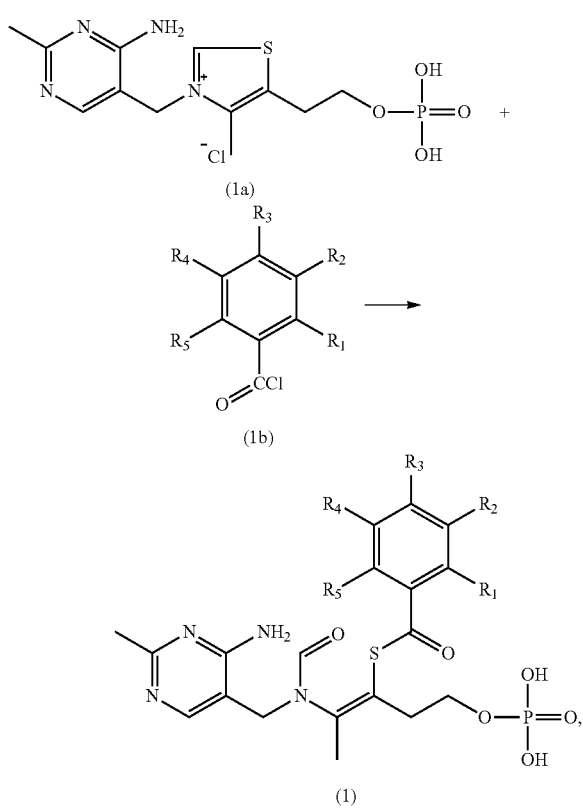

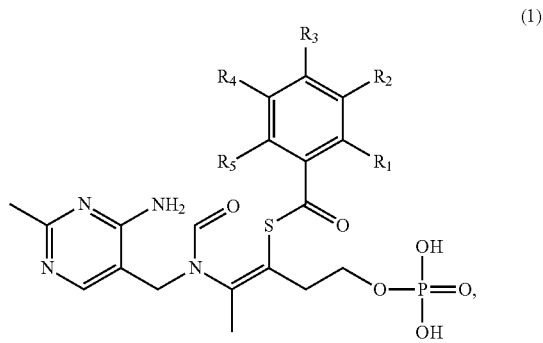

$R_1$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_2$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_3$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_4$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_5$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group; and wherein at least one of $R_1$, $R_2$, $R_3$, $R_4$ and $R_5$ is not hydrogen atom.

Optionally, only one of $R_1$, $R_2$, $R_3$, $R_4$ and $R_5$ is not hydrogen atom, and any one of the others is hydrogen atom.

Optionally, each one of $R_2$, $R_3$, $R_4$ and $R_5$ is hydrogen atom, and $R_1$ is halogen atom or ethoxy group.

Optionally, each one of $R_2$, $R_3$, $R_4$ and $R_5$ is hydrogen atom, and $R_1$ is fluorine atom or bromine atom.

Optionally, each one of $R_1$, $R_3$, $R_4$ and $R_5$ is hydrogen atom, and $R_2$ is bromine atom, chlorine atom, fluorine atom or nitro group.

Optionally, each one of $R_1$, $R_2$, $R_4$ and $R_5$ is hydrogen atom, and $R_3$ is chlorine atom, methoxy group or nitro group.

In an embodiment, a pharmaceutical composition comprising any one of the benfotiamine derivatives above or a salt thereof is provided.

Optionally, the pharmaceutical composition is used for preparing a medicine for preventing and treating Alzheimer's disease or aging.

Compared with the prior art, the present disclosure relates to a series of benfotiamine derivatives. Furthermore, in the present disclosure, when the ortho position of benzene ring is only a halogen atom, or an ethoxy group substitution, or the meta position is only a bromine atom, a chlorine atom, a fluorine atom or a nitro group substitution, or the para position is only a chlorine atom, a methoxy or a nitro group substitution; its compound has significant inhibition effect on Aβ40 and Aβ42. What is more, when the ortho position of benzene ring is only a fluorine atom or a bromine atom substitution, the compound has an outstanding inhibition effect on Aβ40 and Aβ42.

DETAILED DESCRIPTION

In an embodiment, benfotiamine derivatives are provided, wherein the benfotiamine derivatives are as shown in formula (1):

wherein, $R_1$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_2$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_3$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_4$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_5$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group; and wherein at least one of $R_1$, $R_2$, $R_3$, $R_4$ and $R_5$ is not hydrogen atom.

In some embodiments, the hydrocarbyl group includes a straight chain, branched chain or cyclic hydrocarbyl group, and the hydrocarbyl group may be alkane base, may also be olefin base or acetylene base, but optionally alkane base, more specifically, e.g. methyl, ethyl, vinyl, allyl, n-propyl, isopropyl, n-butyl, sec-butyl, tertiary butyl, isobutyl, amyl, 1-ethyl propyl, 1-methyl butyl, cyclopentyl, hexyl, 1-methyl amyl, 1-ethyl butyl, cyclohexyl, 2-heptyl, heptyl, octyl, nonyl, decyl, undecyl, dodecyl, tridecyl myristyl, pentadecyl, hexadecyl, heptadecyl, octadecyl, nonadecyl, aryl alkyl, eicosyl, heneicosyl, docosyl, tricosyl, phenyl, 2-methyl phenyl, 3-methyl phenyl, 4-methyl phenyl, 1-naphthyl, 2-naphthyl, benzyl or 2-phenethyl, etc.

In some embodiments, the substituted hydrocarbyl group includes the halogen atom substitution, nitro substitution, cyano substitution, sulfo substitution, amine substitution, carboxyl substitution, hydroxyl substitution or sulfydryl substitution, etc., such as methoxy ethyl, ethoxy ethyl, butoxy ethyl, trifluoromethyl, or pentafluoroethyl, etc. as described above.

In some embodiments, the alkoxy group includes a straight chain, branched chain or cyclic alkoxy, e.g. methoxy, ethoxy, n-propoxy, isopropoxy, n-butoxy, sec-butoxy, tert-butoxy, isobutoxy, pentyloxy, 1-ethyl propoxy, 1-methyl butoxy, cyclic pentyloxy, hexyloxy, 1-methyl pentyloxy, 1-ethyl butoxy, cyclic hexyloxy, 2-heptyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, aryl alkyloxy, eicosyloxy, heneicosyloxy, docosyloxy, tricosyloxy, phenyloxy, 2-methyl phenyloxy, 3-methyl phenyloxy, 4-methyl phenyloxy, 1-naphthyloxy, 2-naphthyloxy, benzyloxy or 2-phenethyloxy, etc.

In some embodiments, the substituted alkoxy group includes the halogen atom substitution, nitro substitution, cyano substitution, sulfo substitution, amine substitution, carboxyl substitution, hydroxyl substitution or sulfydryl substitution, etc., more specifically, e.g. methoxy ethyloxy, ethoxy ethyloxy, butoxy ethyloxy, trifluoromethyloxy, or pentafluoroethyloxy, etc.

In some embodiments, the acyl group includes a variety of alkyl acyl or a variety of substituted alkyl acyl, and the substituted acyl includes the halogen atom substitution, nitro substitution, cyano substitution, sulfo substitution, amine substitution, carboxyl substitution, hydroxyl substitution or sulfydryl substitution, etc., more specifically, e.g. formyl, acetyl, n-propionyl, sec-propionyl, n-butanoyl, sec-butyryl, t-butyryl, iso-butyryl, valeryl, 1-ethyl propionyl, 1-methyl butanoyl, cyclopentanoyl, hexanoyl, 1-methyl valeryl, 1-ethyl butanoyl, cyclohexanoyl, 2-heptanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl, aryl alkenoyl, eicosanoyl, heneicosanoyl, docosanoyl, tricosanoyl, benzoyl, 2-methyl benzoyl, 3-methyl benzoyl, 4-methyl benzoyl, 1-naphthoyl, 2-naphthoyl, benzoyl, 2-phenylacetyl, methoxy ethanoyl, ethoxy acetyl, butoxy acetyl, trifluoroformyl or pentafluoroacetyl, etc.

Considering the inhibitory effect of the benfotiamine derivatives on Aβ40 and Aβ42, optionally only one of $R_1$, $R_2$, $R_3$, $R_4$ and $R_5$ is not hydrogen atom, and any one of the others is hydrogen atom, further optionally each one of $R_2$, $R_3$, $R_4$ and $R_5$ is hydrogen atom, and $R_1$ is halogen atom or ethoxy group, or each one of $R_1$, $R_3$, $R_4$ and $R_5$ is hydrogen atom, and $R_2$ is bromine atom, chlorine atom, fluorine atom or nitro group, or each one of $R_1$, $R_2$, $R_4$ and $R_5$ is hydrogen atom, and $R_3$ is chlorine atom, methoxy group or nitro group, and further optionally each one of $R_2$, $R_3$, $R_4$ and $R_5$ is hydrogen atom, and $R_1$ is fluorine atom or bromine atom.

In an embodiment, a method for preparing the above benfotiamine derivatives is provided, wherein a compound of monophosphothiamine the formula (1a) shows reacts with a compound of benzoyl chloride the formula (1b) shows so as to prepare and obtain the benfotiamine derivatives of the formula (1),

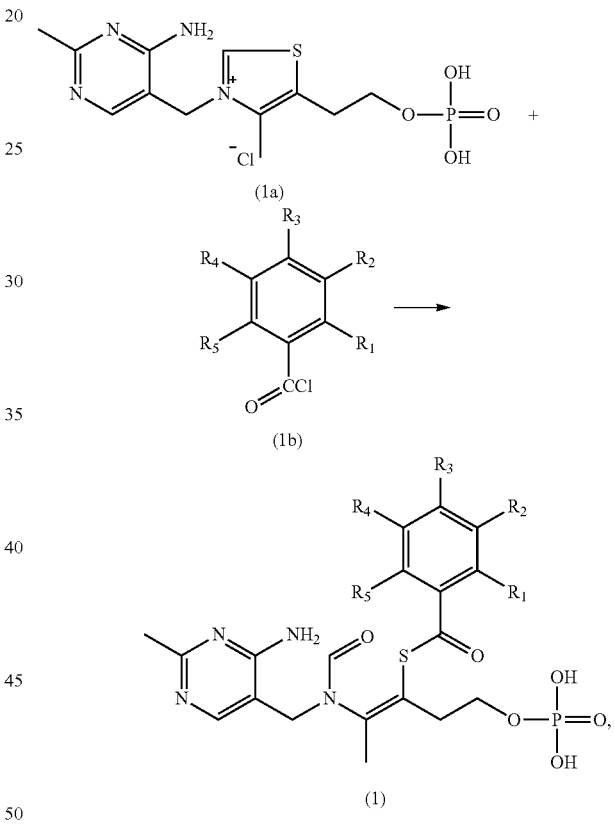

wherein, $R_1$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_2$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_3$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_4$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group;

$R_5$ is selected from a group consisting of hydrogen atom, halogen atom, nitro group, cyano group, sulfo group, amino group, carboxyl group, hydroxyl group, sulfydryl group, hydrocarbyl group, substituted hydrocarbyl group, alkoxy group, substituted alkoxy group and acyl group; and wherein at least one of $R_1$, $R_2$, $R_3$, $R_4$ and $R_5$ is not hydrogen atom.

The method for preparing the benfotiamine derivatives according to embodiments of the present disclosure may be carried out by the reference to the existing method of preparing benfotiamine with the reaction of monophosphothiamine and benzoyl chloride. For example, the experimental conditions disclosed in the patent application EP2918593A1, the monophosphothiamine shown in the formula (1a) is dissolved in water, cooled to 0-5° C., added with 30% sodium hydroxide solution, adjusted to have the pH value between 11 and 12, and stirred for 1-2 hours. Under the temperature for 0-5° C., the above solution is added with benzoyl chloride shown in the formula (1b). The pH value is controlled and adjusted between 11 and 12 during above process. After finishing adding, tester needs to get the above solution to react for 1-3 hours under the temperature for 5-10° C., then concentrated hydrochloric acid is added to adjust the pH value to between 3 and 4, stirring and filtering are performed with adding ethyl acetate, and the filter cake is dried to obtain the product.

In some embodiments, the method for preparing the benfotiamine derivatives is limited to $R_1$, $R_2$, $R_3$, $R_4$ and $R_5$ as described above.

Further, the present disclosure also provides a pharmaceutical composition comprising the benfotiamine derivatives or a salt thereof, optionally the pharmaceutical composition is used to prepare a pharmaceutical composition for the prevention and treatment of Alzheimer's disease or aging. The salt is medically acceptable salt, such as lithium salt, sodium salt, potassium salt or calcium salt, etc. The composition may be made into tablets, powders, aerosols, water-injection, powder-injection, rectal suppositories or skin patches (transdermal administration) according to the conventional method.

EXAMPLES

Measurement of the Present Disclosure

Nuclear magnetic ($^1$H NMR): NMR displacement (δ) is given in units of $10^{-6}$ (ppm). NMR spectra are obtained using a Bruker AVANCE-500 nuclear magnetometer using deuterated dimethyl sulfoxide (DMSO-$d_6$), deuterated methanol (CD$_3$OD) or deuterated water (D$_2$O) as a solvent and tetramethylsilane (TMS) as the internal standard.

Mass spectrometry (MS): Determination of MS by Agilent (ESI) mass spectrometer (producer: Agilent, Model: Agilent 6110).

1. Bioassays

Materials and Methods (1) BCA protein concentration assay kit is purchased from Beyotime, Aβ40 and AB42 test kits are purchased from Wako Company. Except the fetal bovine serum (FBS) is purchased from Shanghai Pulong Biotechnology Research and Development Co. Ltd., the other related reagents are purchased from Gibico Company.

(2) HEK293APP/sw overexpression cell culture: cells are cultured in 48 microwell plate with DMEM culture solution (including 10% FBS, 100 μg/mL G418 (Geneticin) and penicillin and streptomycin), and a 4 mM stock in DMEM is diluted with DMEM to 400 μM and added to cell culture medium by 500 μL/well at 70% cell density and treated for 24 h.

(3) After the supernatant of culture solution is added to the BCA reagent at room temperature for 30 minutes, the absorption value of each well is measured at the OD 570 nm by the microplate reader and the total protein concentration is calculated according to the protein standard curve. Meanwhile, the concentration of Aβ40 and Aβ42 in the supernatant of culture solution is measured. Briefly, the supernatant is added to the 96 microwell plate coated by primary antibodies and incubated at 4° C. for overnight. Then the solution in the 96 microwell plate is removed and washed, and HRP (horseradish oxide enzyme) marked antibody is added to the solution and incubated at 4° C. for 2 hours. The antibody is removed and the plate is washed. After TMB substrate is added to each well at room temperature for 30 minutes, and the stop buffer is added to each well. The absorption value of each well is measured at the OD 450 nm by the microplate reader and the concentrations of Aβ40 and Aβ42 are calculated according to the standard curves of Aβ40 and Aβ42 respectively, and the final concentration is obtained by adjusting the concentrations of Aβ40 and Aβ42 according to the total protein concentration.

Example 1

(Z)-S-(2-(N-((4-amino-2-methylpyrimidin-5-yl)methyl)formamido)-5-(phosphonooxy)pent-2-en-3-yl)3-methoxybenzothioate 1-1 is Synthesized

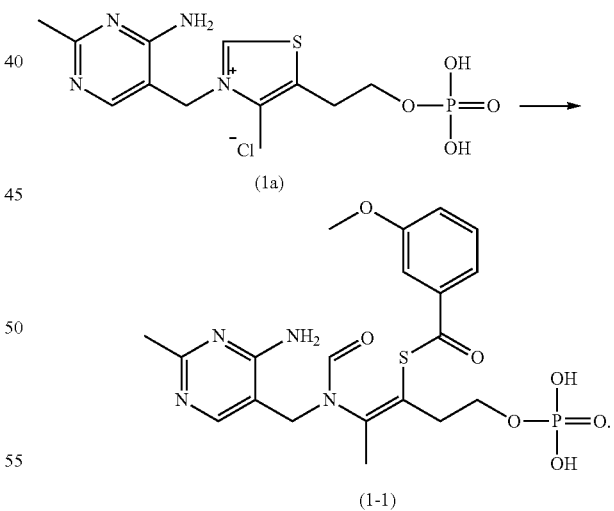

The monophosphothiamine (38 g, 0.09 mol) is dissolved in water (103 g, 5.7 mol), and cooled to 0-5° C. 30% sodium hydroxide solution (87.3 g, 0.65 mol) is added to the solution cooled, adjusted with the pH between 11 and 12, and stirred for 1.5 hours. After that, the 3-methoxybenzoyl chloride (20.4 g, 0.12 mol) is added to the above solution at 0-5° C., and controlled to regulate the pH value between 11 and 12 during the process. Then, it is reacted for 2 hours at 5-10° C. Thereafter, concentrated hydrochloric acid (34 g, 0.33 mol) is added to the solution reacted to adjust the pH between 3 and 4, then 50 mL ethyl acetate is added to the above solution and stirred for 16 hours. The solution stirred is filtered to obtain a cake and the cake is dried to obtain product 1-1 (11 g, off-white solids).

The results of the product 1-1 measured by nuclear magnetic ($^1$H NMR) and mass spectrometry (MS) are shown as follows. The results of bioassays of the stock prepared with product 1-1 are shown in table 1.

MS m/z (ESI): 497.1 [M+H]$^+$ $^1$H NMR (DMSO-d$_6$) δ 7.85 (d, 1H), 7.78 (d, 1H), 7.40 (t, 1H), 7.30 (d, 1H), 7.25 (d, 1H), 7.13 (d, 1H), 4.45-4.25 (m, 2H), 3.88-3.75 (m, 5H), 2.75-2.65 (m, 2H), 2.25 (s, 3H), 2.15 (s, 3H).

Example 2

(Z)-S-(2-(N-((4-amino-2-methylpyrimidin-5-yl)methyl)formamido)-5-(phosphonooxy)pent-2-en-3-yl)4-ethoxybenzothioate 1-2 is Synthesized

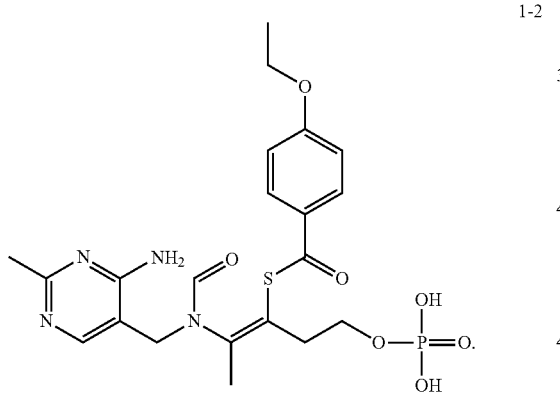

In the example, the synthetic route of example 1 is employed, the reactant of 3-methoxybenzoyl chloride is replaced with 4-ethoxybenzoyl chloride, and product 1-2 (1.1 g, off-white solids) is obtained.

The results of the product 1-2 measured by nuclear magnetic ($^1$H NMR) and mass spectrometry (MS) are shown as follows. The results of bioassays of the stock prepared with product 1-2 are shown in table 1.

MS m/z (ESI): 511.1 [M+H]$^+$ $^1$H NMR (DMSO-d$_6$) δ 7.85 (d, 1H), 7.78 (d, 1H) 7.65 (d, 2H), 7.00 (d, 2H), 4.50-4.35 (m, 2H), 4.20-4.15 (m, 2H), 3.80-3.70 (m, 2H) 2.75-2.65 (m, 2H), 2.25 (s, 3H), 2.15 (s, 3H), 1.30 (t, 3H).

Example 3

(Z)-S-(2-(N-((4-amino-2-methylpyrimidin-5-yl)methyl)formamido)-5-(phosphonooxy)pent-2-en-3-yl)4-hydroxybenzothioate 1-3 is Synthesized

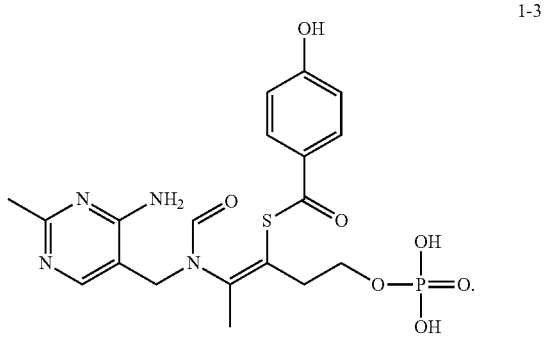 [SMILES: C/C(=C(\CCOP(=O)(O)O)SC(=O)c1ccc(O)cc1)N(C=O)Cc1cnc(C)nc1N]

In the example, the synthetic route of example 1 is employed, the reactant of 3-methoxybenzoyl chloride is replaced with 4-hydroxybenzoyl chloride, and product 1-3 (0.2 g, off-white solids) is obtained.

The results of the product 1-3 measured by nuclear magnetic ($^1$H NMR) and mass spectrometry (MS) are shown as follows. The results of bioassays of the stock prepared with product 1-3 are shown in table 1.

MS m/z (ESI): 483.1 [M+H]$^+$ $^1$H NMR (DMSO-d$_6$) δ 7.90 (s, 1H), 7.85 (s, 1H), 7.61 (d, 2H), 6.85 (d, 2H), 4.53-4.31 (m, 2H), 3.87-3.78 (m, 2H), 2.76-2.64 (m, 2H), 2.30 (s, 3H), 2.17 (s, 3H).

Example 4

(Z)-S-(2-(N-((4-amino-2-methylpyrimidin-5-yl)methyl)formamido)-5-(phosphonooxy)pent-2-en-3-yl)2,6-difluorobenzothioate 1-4 is Synthesized

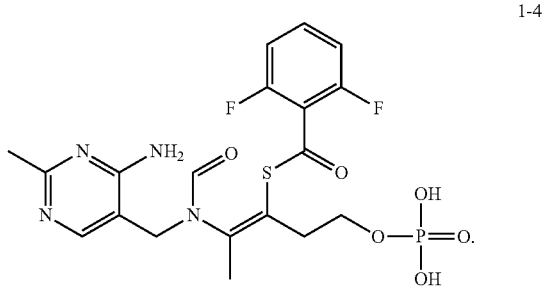 [SMILES: C/C(=C(\CCOP(=O)(O)O)SC(=O)c1c(F)cccc1F)N(C=O)Cc1cnc(C)nc1N]

In the example, the synthetic route of example 1 is employed, the reactant of 3-methoxybenzoyl chloride is replaced with 2,6-difluoro benzoyl chloride, and product 1-4 (2.2 g, off-white solids) is obtained.

The results of the product 1-4 measured by nuclear magnetic ($^1$H NMR) and mass spectrometry (MS) are shown as follows. The results of bioassays of the stock prepared with product 1-4 are shown in table 1.

MS m/z (ESI): 503.0 [M+H]+

$^1$H NMR (DMSO-d$_6$) δ 7.85 (d, 2H), 7.65 (d, 1H), 7.25 (d, 2H), 4.65-4.35 (m, 2H), 3.80-3.70 (m, 2H), 2.75-2.65 (m, 2H), 2.25 (s, 3H), 2.15 (s, 3H).

Example 5

(Z)-S-(2-(N-((4-amino-2-methylpyrimidin-5-yl)methyl)formamido)-5-(phosphonooxy)pent-2-en-3-yl)3-bromobenzothioate 1-5 is Synthesized

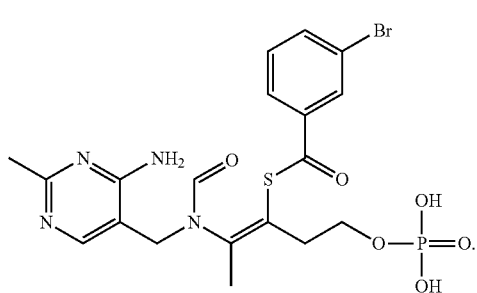

In the example, the synthetic route of example 1 is employed, the reactant 3-methoxybenzoyl chloride is replaced with 3-bromobenzoyl chloride, and product 1-5 (1.7 g, off-white solids) is obtained.

The results of the product 1-5 measured by nuclear magnetic ($^1$H NMR) and mass spectrometry (MS) are shown as follows. The results of bioassays of the stock prepared with product 1-5 are shown in table 1.

MS m/z (ESI): 545.0 [M+H]+

$^1$H NMR (DMSO-d$_6$) δ 7.93-7.89 (m, 3H), 7.76-7.72 (d, 2H), 7.48 (d, 1H), 4.65-4.35 (m, 2H), 3.87 (d, 2H), 2.70 (d, 2H), 2.28 (s, 3H), 2.20 (s, 3H).

Example 6

(Z)-S-(2-(N-((4-amino-2-methylpyrimidin-5-yl)methyl)formamido)-5-(phosphonooxy)pent-2-en-3-yl)3-nitrobenzothioate 1-6 is Synthesized

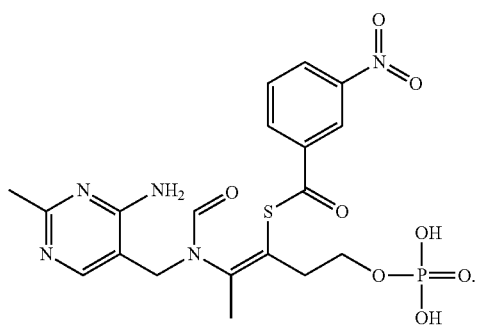

In the example, the synthetic route of example 1 is employed, the reactant of 3-methoxybenzoyl chloride is replaced with 3-nitrobenzoyl chloride, and product 1-6 (0.2 g, off-white solids) is obtained.

The results of the product 1-6 measured by nuclear magnetic ($^1$H NMR) and mass spectrometry (MS) are shown as follows. The results of bioassays of the stock prepared with product 1-6 are shown in table 1.

MS m/z (ESI): 512.2 [M+H]+

$^1$H NMR (DMSO-d$_6$) δ 8.50 (d, 1H), 8.35 (d, 1H), 8.15 (d, 1H), 7.90 (d, 1H), 7.87 (d, 1H), 7.75 (t, 1H), 4.50-4.35 (m, 2H), 3.87-3.75 (d, 2H), 2.70 (d, 2H), 2.20 (s, 6H).

Example 7

(Z)-S-(2-(N-((4-amino-2-methylpyrimidin-5-yl)methyl)formamido)-5-(phosphonooxy)pent-2-en-3-yl)4-fluorobenzothioate 1-7 is Synthesized

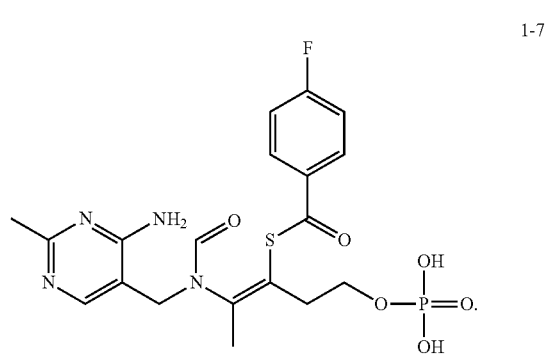 [SMILES: C/C(=C(\CCOP(=O)(O)O)SC(=O)c1ccc(F)cc1)N(C=O)Cc1cnc(C)nc1N]

In the example, the synthetic route of example 1 is employed, the reactant of 3-methoxybenzoyl chloride is replaced with 4-fluorobenzoyl chloride, and product 1-7 (11 g, off-white solids) is obtained.

The results of the product 1-7 measured by nuclear magnetic ($^1$H NMR) and mass spectrometry (MS) are shown as follows. The results of bioassays of the stock prepared with product 1-7 are shown in table 1.

MS m/z (ESI): 485.1 [M+H]+

$^1$H NMR (DMSO-d$_6$) δ 7.93 (s, 1H), 7.90 (s, 1H), 7.79 (d, 2H), 7.40 (d, 2H), 4.54-4.37 (m, 2H), 3.86 (d, 2H), 2.70 (d, 2H), 2.25 (s, 3H), 2.20 (s, 3H).

Example 8

(Z)-S-(2-(N-((4-amino-2-methylpyrimidin-5-yl)methyl)formamido)-5-(phosphonooxy)pent-2-en-3-yl)3-fluorobenzothioate 1-8 is Synthesized

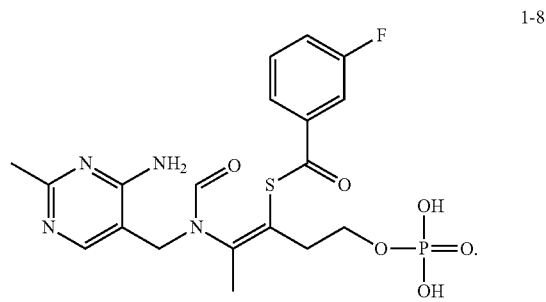 [SMILES: C/C(=C(\CCOP(=O)(O)O)SC(=O)c1cccc(F)c1)N(C=O)Cc1cnc(C)nc1N]

In the example, the synthetic route of example 1 is employed, the reactant of 3-methoxybenzoyl chloride is replaced with 3-fluorobenzoyl chloride, and product 1-8 (11 g, off-white solids) is obtained.

The results of the product 1-8 measured by nuclear magnetic ($^1$H NMR) and mass spectrometry (MS) are shown as follows. The results of bioassays of the stock prepared with product 1-8 are shown in table 1.

MS m/z (ESI): 485.1 [M+H]+

$^1$H NMR (DMSO-d$_6$) δ 7.88 (s, 1H), 7.84 (s, 1H), 7.58 (d, 3H), 7.41 (d, 1H), 4.51-4.35 (m, 2H), 3.84 (d, 2H), 2.71 (d, 2H), 2.23 (s, 3H), 2.19 (s, 3H).

Example 9

(Z)-S-(2-(N-((4-amino-2-methylpyrimidin-5-yl)methyl)formamido)-5-(phosphonooxy)pent-2-en-3-yl)2-fluorobenzothioate 1-9 is Synthesized

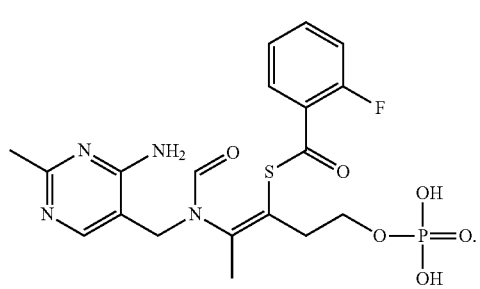

1-9

In the example, the synthetic route of example 1 is employed, the reactant of 3-methoxybenzoyl chloride is replaced with 2-fluorobenzoyl chloride, and product 1-9 (11 g, off-white solids) is obtained.

The results of the product 1-9 measured by nuclear magnetic ($^1$H NMR) and mass spectrometry (MS) are shown as follows. The results of bioassays of the stock prepared with product 1-9 are shown in table 1.

MS m/z (ESI): 485.1 [M+H]+

$^1$H NMR (DMSO-d$_6$) δ 7.94 (s, 1H), 7.89 (s, 1H), 7.67 (d, 2H), 7.37 (d, 2H), 4.55-4.36 (m, 2H), 3.85 (d, 2H), 2.71 (d, 2H) 2.26 (s 3H), 2.20 (s 3H).

Example 10

(Z)-S-(2-(N-((4-amino-2-methylpyrimidin-5-yl)methyl)formamido)-5-(phosphonooxy)pent-2-en-3-yl)2-methylbenzothioate 1-10 is Synthesized

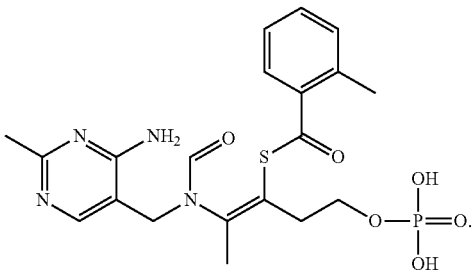

1-10

In the example, the synthetic route of example 1 is employed, the reactant of 3-methoxybenzoyl chloride is replaced with 2-methylbenzoyl chloride, and product 1-10 (11 g, off-white solids) is obtained.

The results of the product 1-10 measured by nuclear magnetic ($^1$H NMR) and mass spectrometry (MS) are shown as follows. The results of bioassays of the stock prepared with product 1-10 are shown in table 1.

MS m/z (ESI): 481.1 [M+H]+

$^1$H NMR (DMSO-d$_6$) δ 7.89 (s, 1H), 7.87 (s, 1H), 7.56 (d, 1H), 7.48 (d, 1H), 7.33 (d, 2H), 4.55-4.36 (m, 2H), 3.85 (d, 2H), 2.78 (d, 2H), 2.31 (s, 3H), 2.27 (s, 3H), 2.19 (s, 3H).

Example 11

(Z)-S-(2-(N-((4-amino-2-methylpyrimidin-5-yl)methyl)formamido)-5-(phosphonooxy)pent-2-en-3-yl)4-nitrobenzothioate 1-11 is Synthesized

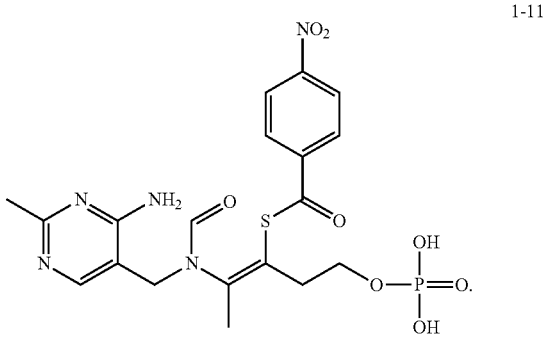 [SMILES: C/C(=C(\CCOP(=O)(O)O)SC(=O)c1ccc([N+](=O)[O-])cc1)N(C=O)Cc1cnc(C)nc1N]

1-11

In the example, the synthetic route of example 1 is employed, the reactant of 3-methoxybenzoyl chloride is replaced with 4-nitrobenzoyl chloride, and product 1-11 (10 g, off-white solids) is obtained.

The results of the product 1-11 measured by nuclear magnetic ($^1$H NMR) and mass spectrometry (MS) are shown as follows. The results of bioassays of the stock prepared with product 1-11 are shown in table 1.

MS m/z (ESI): 512.2 [M+H]+

$^1$H NMR (DMSO-d$_6$) δ 8.35 (s, 1H), 8.33 (s, 1H), 7.94 (d, 1H), 7.92 (d, 2H), 7.87 (s, 1H), 4.56-4.34 (m, 2H), 3.89-3.75 (m, 2H), 2.74 (d, 2H), 2.21 (s, 6H).

Example 12

(Z)-S-(2-(N-((4-amino-2-methylpyrimidin-5-yl)methyl)formamido)-5-(phosphonooxy)pent-2-en-3-yl)4-methoxybenzothioate 1-12 is Synthesized

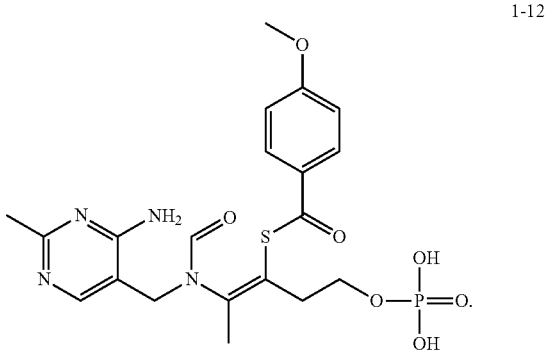 [SMILES: COc1ccc(C(=O)S/C(CCOP(=O)(O)O)=C(/C)N(C=O)Cc2cnc(C)nc2N)cc1]

1-12

In the example, the synthetic route of example 1 is employed, the reactant of 3-methoxybenzoyl chloride is replaced with 4-methoxybenzoyl chloride, and product 1-12 (10 g, off-white solids) is obtained.

The results of the product 1-12 measured by nuclear magnetic ($^1$H NMR) and mass spectrometry (MS) are shown as follows. The results of bioassays of the stock prepared with product 1-12 are shown in table 1.

MS m/z (ESI): 497.1 [M+H]$^+$ $^1$H NMR (DMSO-d$_6$) δ 7.91 (s, 1H), 7.85 (s, 1H), 7.71 (d, 2H), 7.06 (d, 2H), 4.56-4.34 (m, 2H), 3.87-3.75 (m, 5H), 2.70 (s, 2H), 2.30 (s, 3H), 2.18 (s, 3H).

Example 13

(Z)-S-(2-(N-((4-amino-2-methylpyrimidin-5-yl)methyl)formamido)-5-(phosphonooxy)pent-2-en-3-yl)3-chlorobenzothioate 1-13 is Synthesized

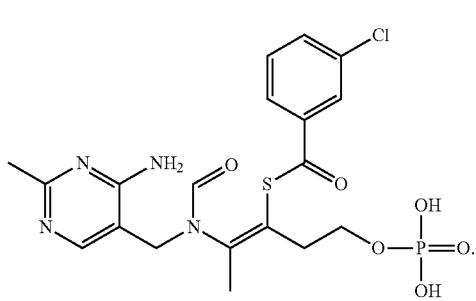

In the example, the synthetic route of example 1 is employed, the reactant of 3-methoxybenzoyl chloride is replaced with 3-chlorobenzoyl chloride, and product 1-13 (10 g, off-white solids) is obtained.

The results of the product 1-13 measured by nuclear magnetic ($^1$H NMR) and mass spectrometry (MS) are shown as follows. The results of bioassays of the stock prepared with product 1-13 are shown in table 1.

MS m/z (ESI): 501.1 [M+H]$^+$ $^1$H NMR (DMSO-d$_6$) δ 7.91 (s, 2H), 7.78 (d, 1H), 7.69 (d, 1H), 7.63 (s, 1H), 7.57 (d, 1H), 7.45-7.20 (m, 2H), 4.53-4.35 (m, 2H), 3.87-3.75 (m, 2H), 2.71 (d, 2H), 2.25 (s, 3H), 2.20 (s, 3H).

Example 14

(Z)-S-(2-(N-((4-amino-2-methylpyrimidin-5-yl)methyl)formamido)-5-(phosphonooxy)pent-2-en-3-yl)3-methylbenzothioate 1-14 is Synthesized

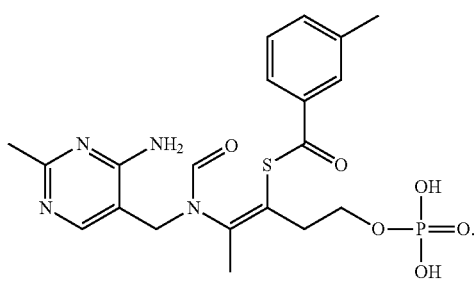

In the example, the synthetic route of example 1 is employed, the reactant of 3-methoxybenzoyl chloride is replaced with 3-methylbenzoyl chloride, and product 1-14 (11 g, off-white solids) is obtained.

The results of the product 1-14 measured by nuclear magnetic ($^1$H NMR) and mass spectrometry (MS) are shown as follows. The results of bioassays of the stock prepared with product 1-14 are shown in table 1.

MS m/z (ESI): 481.1 [M+H]$^+$ $^1$H NMR (DMSO-d$_6$) δ 7.90 (s, 1H), 7.87 (s, 1H), 7.52-7.49 (m, 3H), 7.43 (d, 1H), 4.55-4.36 (m, 2H), 3.86 (d, 2H), 2.71 (s, 2H), 2.38 (s, 3H), 2.28 (s, 3H), 2.18 (s, 3H).

Example 15

(Z)-S-(2-(N-((4-amino-2-methylpyrimidin-5-yl)methyl)formamido)-5-(phosphonooxy)pent-2-en-3-yl)4-chlorobenzothioate 1-15 is Synthesized

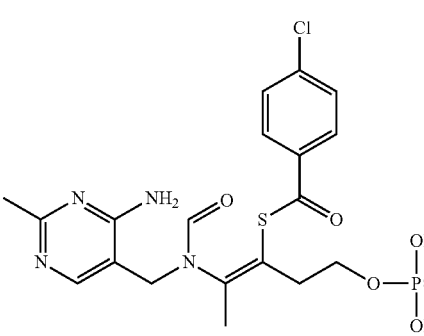

In the example, the synthetic route of example 1 is employed, the reactant of 3-methoxybenzoyl chloride is replaced with 4-chlorobenzoyl chloride, and product 1-15 (0.3 g, off-white solids) is obtained.

The results of the product 1-15 measured by nuclear magnetic ($^1$H NMR) and mass spectrometry (MS) are shown as follows. The results of bioassays of the stock prepared with product 1-15 are shown in table 1.

MS m/z (ESI): 501.0 [M+H]$^+$ $^1$H NMR (DMSO-d$_6$) δ 7.88 (s, 1H), 7.84 (s, 1H), 7.71 (d, 2H), 7.61 (d, 2H), 4.50-4.35 (m, 2H), 3.87 (d, 2H), 2.71 (d, 2H), 2.22 (s, 3H), 2.19 (s, 3H).

Example 16

(Z)-S-(2-(N-((4-amino-2-methylpyrimidin-5-yl)methyl)formamido)-5-(phosphonooxy)pent-2-en-3-yl)3-ethoxybenzothioate 1-16 is Synthesized

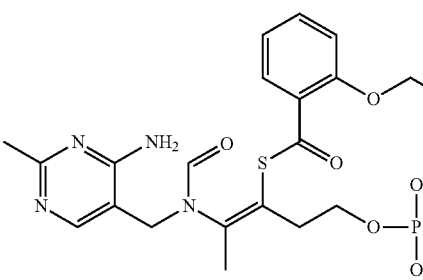

In the example, the synthetic route of example 1 is employed, the reactant of 3-methoxybenzoyl chloride is replaced with 2-ethoxybenzoyl chloride, and product 1-16 (0.2 g, off-white solids) is obtained.

The results of the product 1-16 measured by nuclear magnetic ($^1$H NMR) and mass spectrometry (MS) are shown as follows. The results of bioassays of the stock prepared with product 1-16 are shown in table 1.

MS m/z (ESI): 511.1 [M+H]$^+$ $^1$H NMR (DMSO-d$_6$) δ 8.06 (s, 1H), 7.92 (s, 1H), 7.56 (d, 2H), 7.17 (d, 1H), 7.03 (t, 1H), 4.58-4.38 (m, 2H), 4.18 (q, 2H), 3.93-3.80 (m, 2H), 2.68 (s, 2H), 2.19 (s, 6H), 1.35 (t, 3H).

Example 17

(Z)-S-(2-(N-((4-amino-2-methylpyrimidin-5-yl)methyl)formamido)-5-(phosphonooxy)pent-2-en-3-yl)4-bromobenzothioate 1-17 is Synthesized

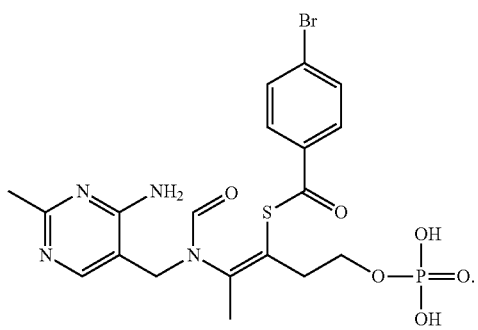

1-17

In the example, the synthetic route of example 1 is employed, the reactant of 3-methoxybenzoyl chloride is replaced with 4-bromobenzoyl chloride, and product 1-17 (3.5 g, off-white solids) is obtained.

The results of the product 1-17 measured by nuclear magnetic ($^1$H NMR) and mass spectrometry (MS) are shown as follows. The results of bioassays of the stock prepared with product 1-17 are shown in table 1.

MS m/z (ESI): 547.0 [M+H]$^+$ $^1$H NMR (DMSO-d$_6$) δ 8.08 (d, 1H), 7.90 (s, 1H), 7.86 (d, 1H), 7.76 (d, 1H), 7.73 (d, 1H), 7.63 (d, 1H), 4.50-4.35 (m, 2H), 3.87-3.75 (m, 2H), 2.70 (t, 2H), 2.24 (s, 3H), 2.19 (s, 3H).

Example 18

(Z)-S-(2-(N-((4-amino-2-methylpyrimidin-5-yl)methyl)formamido)-5-(phosphonooxy)pent-2-en-3-yl)2-bromobenzothioate 1-18 is Synthesized

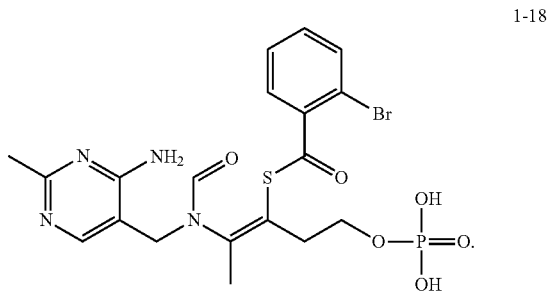

1-18

In the example, the synthetic route of example 1 is employed, the reactant of 3-methoxybenzoyl chloride is replaced with 2-bromobenzoyl chloride, and product 1-18 (3.5 g, off-white solids) is obtained.

The results of the product 1-18 measured by nuclear magnetic ($^1$H NMR) and mass spectrometry (MS) are shown as follows. The results of bioassays of the stock prepared with product 1-18 are shown in table 1.

MS m/z (ESI): 593.0 [M+H]$^+$ $^1$H NMR (DMSO-d$_6$) δ 7.98-7.93 (m, 3H), 7.51 (t, 1H), 7.42 (d, 1H), 7.32 (d, 1H), 4.64-4.32 (m, 2H), 3.87-3.75 (m, 2H), 2.78 (s, 2H), 2.20 (s, 3H), 2.30 (s, 3H).

Example 19

(Z)-S-(2-(N-((4-amino-2-methylpyrimidin-5-yl)methyl)formamido)-5-(phosphonooxy)pent-2-en-3-yl)2-iodobenzothioate 1-19 is Synthesized

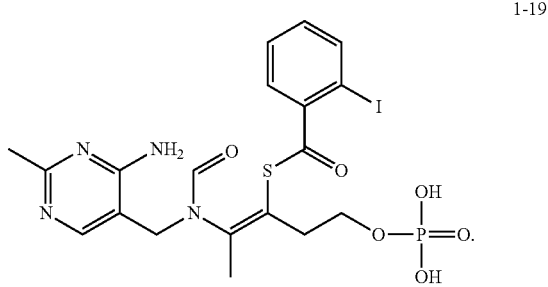 [SMILES: C/C(=C(\CCOP(=O)(O)O)SC(=O)c1ccccc1I)N(C=O)Cc1cnc(C)nc1N]

1-19

In the example, the synthetic route of example 1 is employed, the reactant of 3-methoxybenzoyl chloride is replaced with 2-iodobenzoyl chloride, and product 1-19 (0.06 g, off-white solids) is obtained.

The results of the product 1-19 measured by nuclear magnetic ($^1$H NMR) and mass spectrometry (MS) are shown as follows. The results of bioassays of the stock prepared with product 1-19 are shown in table 1.

MS m/z (ESI): 547.0 [M+H]$^+$ $^1$H NMR (DMSO-d$_6$) δ 7.96 (s, 1H), 7.93 (s, 1H), 7.74 (s, 1H), 7.50 (s, 3H), 4.60-4.35 (m, 2H), 3.87-3.75 (m, 2H), 2.70 (d, 2H), 2.31 (s, 3H), 2.20 (s, 3H).

Example 20

(Z)-S-(2-(N-((4-amino-2-methylpyrimidin-5-yl)methyl)formamido)-5-(phosphonooxy)pent-2-en-3-yl)3-vinylbenzothioate 1-20 is Synthesized

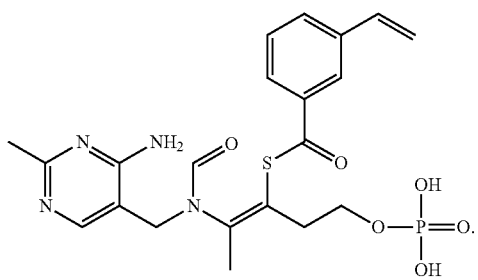

1-20

In the example, the synthetic route of example 1 is employed, the reactant of 3-methoxybenzoyl chloride is replaced with 3-ethenylbenzoyl chloride, and product 1-20 (0.8 g, off-white solids) is obtained.

The results of the product 1-20 measured by nuclear magnetic ($^1$H NMR) and mass spectrometry (MS) are shown as follows. The results of bioassays of the stock prepared with product 1-20 are shown in table 1.

MS m/z (ESI): 492.12 [M+H]$^+$ $^1$H NMR (DMSO-d$_6$) δ 7.93 (s, 1H), 7.89 (s, 1H), 7.83 (d, 1H), 7.72 (s, 1H), 7.63 (d, 1H), 7.53 (t, 1H), 6.80 (q, 1H), 5.93 (d, 1H), 5.38 (d, 1H), 4.48 (br, 2H), 3.87 (d, 2H), 2.72 (s, 2H), 2.27 (s, 3H), 2.20 (s, 3H).

Example 21

(Z)-S-(2-(N-((4-amino-2-methylpyrimidin-5-yl)methyl)formamido)-5-(phosphonooxy)pent-2-en-3-yl)4-vinylbenzothioate 1-21 is Synthesized

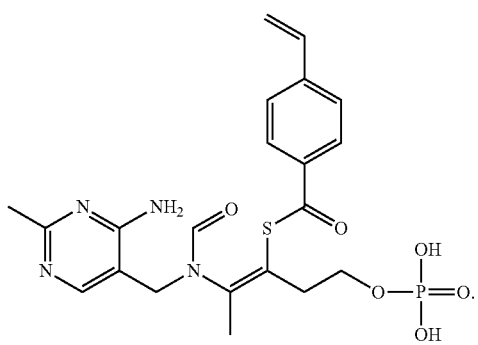

1-21

In the example, the synthetic route of example 1 is employed, the reactant of 3-methoxybenzoyl chloride is replaced with 4-ethenylbenzoyl chloride, and product 1-21 (2 g, off-white solids) is obtained.

The results of the product 1-21 measured by nuclear magnetic ($^1$H NMR) and mass spectrometry (MS) are shown as follows. The results of bioassays of the stock prepared with product 1-21 are shown in table 1.

MS m/z (ESI): 492.12 [M+H]$^+$ $^1$H NMR (DMSO-d$_6$) δ 7.88-7.87 (m, 2H), 7.70 (d, 2H), 7.62 (d, 2H), 7.13 (br, 2H), 6.85 (q, 1H), 6.04 (d, 1H), 5.45 (d, 1H), 4.43 (br, 2H), 3.82 (d, 2H), 2.71 (s, 2H), 2.23 (s, 3H), 2.18 (s, 3H).

Example 22

(Z)-S-(2-(N-((4-amino-2-methylpyrimidin-5-yl)methyl)formamido)-5-(phosphonooxy)pent-2-en-3-yl)2-nitrobenzothioate 1-22 is Synthesized

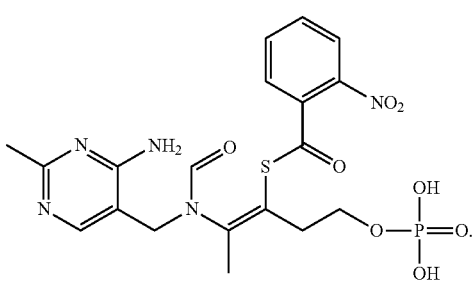

1-22

In the example, the synthetic route of example 1 is employed, the reactant of 3-methoxybenzoyl chloride is replaced with 2-nitrobenzoyl chloride, and product 1-22 (50 mg, off-white solids) is obtained.

The results of the product 1-22 measured by nuclear magnetic ($^1$H NMR) and mass spectrometry (MS) are shown as follows. The results of bioassays of the stock prepared with product 1-22 are shown in table 1.

MS m/z (ESI): 512.2 [M+H]$^+$ $^1$H NMR (DMSO-d$_6$) δ 8.12 (d, 1H), 7.93 (s, 1H), 7.92 (s, 1H), 7.87-7.83 (m, 2H), 7.63 (d, 1H), 7.29 (br, 1H), 4.49 (br, 2H), 3.89 (d, 2H), 2.74 (s, 2H), 2.25 (s, 3H), 2.20 (s, 3H).

Example 23

(Z)-S-(2-(N-((4-amino-2-methylpyrimidin-5-yl)methyl)formamido)-5-(phosphonooxy)pent-2-en-3-yl)2,6-dimethylbenzothioate 1-23 is Synthesized

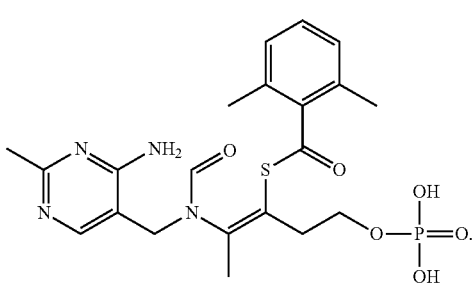

1-23

In the example, the synthetic route of example 1 is employed, the reactant of 3-methoxybenzoyl chloride is replaced with 2,6-dimethylbenzoyl chloride, and product 1-23 (18 mg, off-white solids) is obtained.

The results of the product 1-23 measured by nuclear magnetic ($^1$H NMR) and mass spectrometry (MS) are shown as follows. The results of bioassays of the stock prepared with product 1-23 are shown in table 1.

MS m/z (ESI): 495.1 [M+H]$^+$ $^1$H NMR (DMSO-d$_6$) δ 7.97 (d, 2H), 7.26 (s, 1H), 7.08 (s, 2H), 4.85 (br, 2H), 3.86 (s, 2H), 2.76 (s, 2H), 2.32 (s, 3H), 2.19 (s, 3H).

Comparative Example 1

Bioassay is carried out without the stock and a medium as a control, the results of which are shown in table 1.

Comparative Example 2

The results of bioassay of the stock prepared with benfotiamine are shown in table 1.

Table 1 shows the content of Aβ40 and Aβ42 protein secreted by APP/293 cells after treatment of benfotiamine derivatives.

TABLE 1

| Compound | Aβ42 content (pmol/L) | Aβ40 content (pmol/L) | Compound | Aβ42 content (pmol/L) | Aβ40 content (pmol/L) |
|---|---|---|---|---|---|
| Example 1 | 12.14 | 135.09 | Example 2 | 7.19 | 93.07 |
| Example 3 | 10.79 | 121.48 | Example 4 | 8.86 | 133.25 |
| Example 5 | 6.77 | 25.65 | Example 6 | 3.31 | 81.05 |
| Example 7 | 13.08 | 152.06 | Example 8 | 8.35 | 87.33 |
| Example 9 | 2.01 | 15.00 | Example 10 | 9.78 | 112.32 |
| Example 11 | 5.21 | 60.98 | Example 12 | 3.92 | 41.60 |
| Example 13 | 6.37 | 69.35 | Example 14 | 6.41 | 97.97 |
| Example 15 | 7.16 | 60.27 | Example 16 | 5.93 | 42.76 |
| Example 17 | 8.89 | 112.53 | Example 18 | 2.60 | 21.19 |
| Example 19 | 5.50 | 62.74 | Example 20 | 10.33 | 117.16 |
| Example 21 | 11.24 | 127.41 | Example 22 | 11.31 | 127.81 |
| Example 23 | 12.64 | 143.18 | Comparative Example 1 | 11.08 | 127.81 |
| Comparative Example 2 | 5.04 | 53.77 | | | |

It can be seen in Table 1, compared with blank control (Comparative Example 1), benfotiamine shows good effect on reducing the generation of Aβ40 and Aβ42 peptides; some benfotiamine derivatives show no significant effect on reducing the generation of Aβ40 and Aβ42 peptides, such as Example 3, Example 21 and Example 22; some benfotiamine derivatives cause even more generation of Aβ40 and Aβ42 peptides, such as Example 7 and Example 23; and some benfotiamine derivatives also show quite good effect on reducing the generation of Aβ40 and Aβ42 peptides. This result indicates that benfotiamine derivatives may have different effects on the generation of Aβ40 and Aβ42 peptides from the cells, and which benfotiamine derivative could inhibit the generation of Aβ40 and Aβ42 peptides is unpredictable.

The benfotiamine derivatives show effect on reducing the contents of Aβ40 and Aβ42 secreted by APP/293 cells are listed in Table 2.

TABLE 2

| Compound | Aβ42 content (pmol/L) | Aβ40 content (pmol/L) |
|---|---|---|
| Comparative Example 1 (Blank Control) | 11.08 | 127.81 |
| Example 2 | 7.19 | 93.07 |
| Example 5 | 6.77 | 25.65 |
| Example 6 | 3.31 | 81.05 |
| Example 8 | 8.35 | 87.33 |
| Example 9 | 7.01 | 15.00 |
| Example 10 | 9.78 | 112.32 |
| Example 11 | 5.21 | 60.98 |

TABLE 2-continued

| Compound | Aβ42 content (pmol/L) | Aβ40 content (pmol/L) |
|---|---|---|
| Example 12 | 3.92 | 41.60 |
| Example 13 | 6.37 | 69.35 |
| Example 14 | 6.41 | 97.97 |
| Example 15 | 7.16 | 60.27 |
| Example 16 | 5.93 | 42.76 |
| Example 17 | 8.89 | 112.53 |
| Example 18 | 2.60 | 21.19 |
| Example 19 | 5.50 | 62.74 |

Therefore, the compounds in Table 2 may be used in the manufacture of a medicament tier the treatment of Alzheimer's disease.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

What is claimed is:

1. A method of treating Alzheimer's disease comprising administering a benfotiamine derivative to a subject in need thereof, wherein the benfotiamine derivative has a structure selected from the group consisting of:

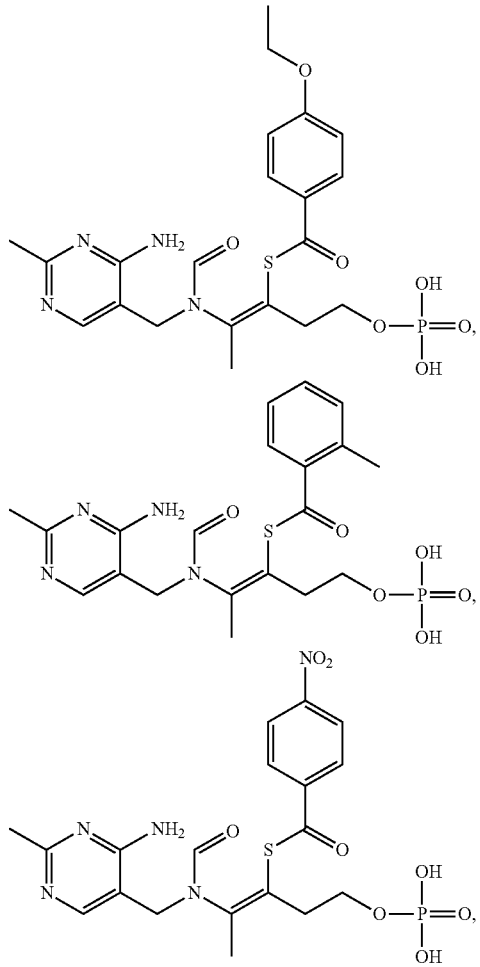

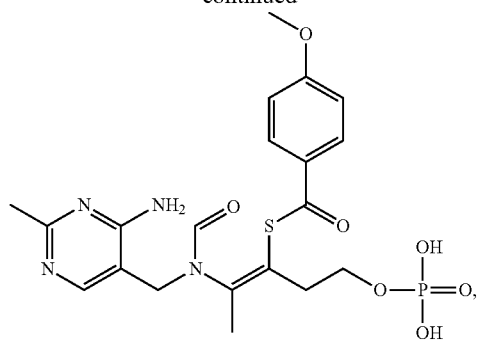
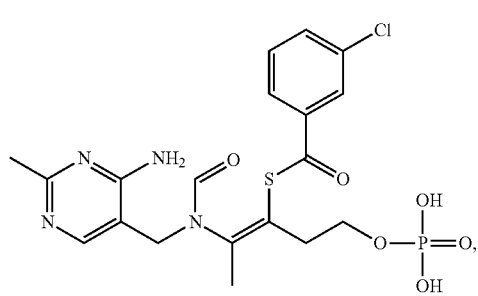
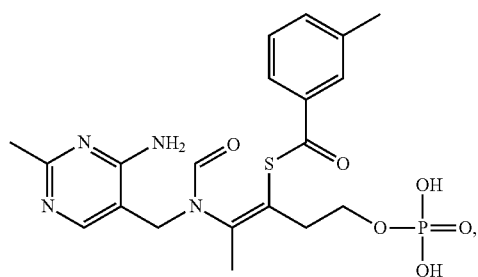
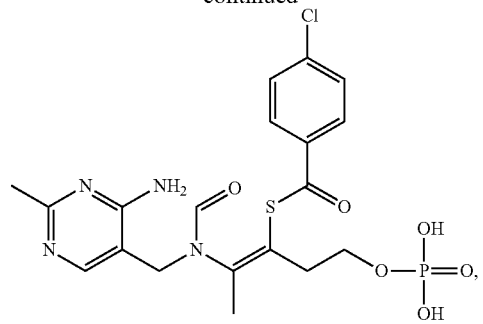
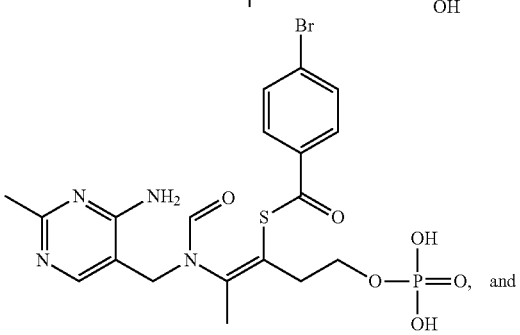
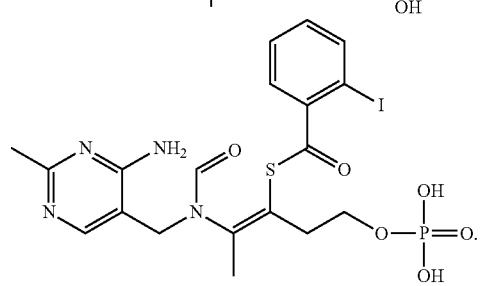
2. The method according to claim 1, wherein the benfotiamine derivative is formulated with a pharmaceutically acceptable carrier.
\* \* \* \* \*